United States Patent
Griffin

(10) Patent No.: US 8,502,837 B2
(45) Date of Patent: Aug. 6, 2013

(54) SYSTEM AND METHOD FOR ACTIVATING COMPONENTS ON AN ELECTRONIC DEVICE USING ORIENTATION DATA

(75) Inventor: Jason Tyler Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 666 days.

(21) Appl. No.: 12/717,581

(22) Filed: Mar. 4, 2010

(65) Prior Publication Data

US 2011/0216093 A1    Sep. 8, 2011

(51) Int. Cl.
*G09G 5/00* (2006.01)

(52) U.S. Cl.
USPC ......................................................... 345/659

(58) Field of Classification Search
USPC ......................................................... 345/659
See application file for complete search history.

(56) References Cited

U.S. PATENT DOCUMENTS

| | | | |
|---|---|---|---|
| 5,796,822 A | 8/1998 | Larson et al. | |
| 5,884,156 A | 3/1999 | Gordon | |
| 6,522,894 B1 | 2/2003 | Schmidt | |
| 7,092,512 B2 | 8/2006 | Kato et al. | |
| 7,260,364 B2 | 8/2007 | Eaton | |
| 2007/0188450 A1 | 8/2007 | Hernandez | |
| 2008/0161061 A1 | 7/2008 | You | |
| 2009/0137286 A1 | 5/2009 | Luke | |
| 2010/0008523 A1 | 1/2010 | Demuynck | |

FOREIGN PATENT DOCUMENTS

EP    1884863 A1    2/2008

OTHER PUBLICATIONS

Unknown. HTC Touch Pro2 Specification. 2009. From http://www.htc.com.
Unknown. TriSpecs Glasses with Dual Microphones/Speakers. 2009. From http://www.geekcivilization.com/trispecs-glasses-with-dual-microphonesspeakers/.

*Primary Examiner* — Ryan R Yang
(74) *Attorney, Agent, or Firm* — McCarthy Tétrault LLP

(57) ABSTRACT

The disclosure relates to a system and method for analyzing an orientation of a handheld electronic device. The method comprises: monitoring data from a first sensor for the device; determining an orientation of the device by analyzing at least the data from the first sensor; and activating a first component on the device in view of the orientation of the device. The method may further comprise deactivating a second component on the device in view of the orientation of the device.

16 Claims, 11 Drawing Sheets

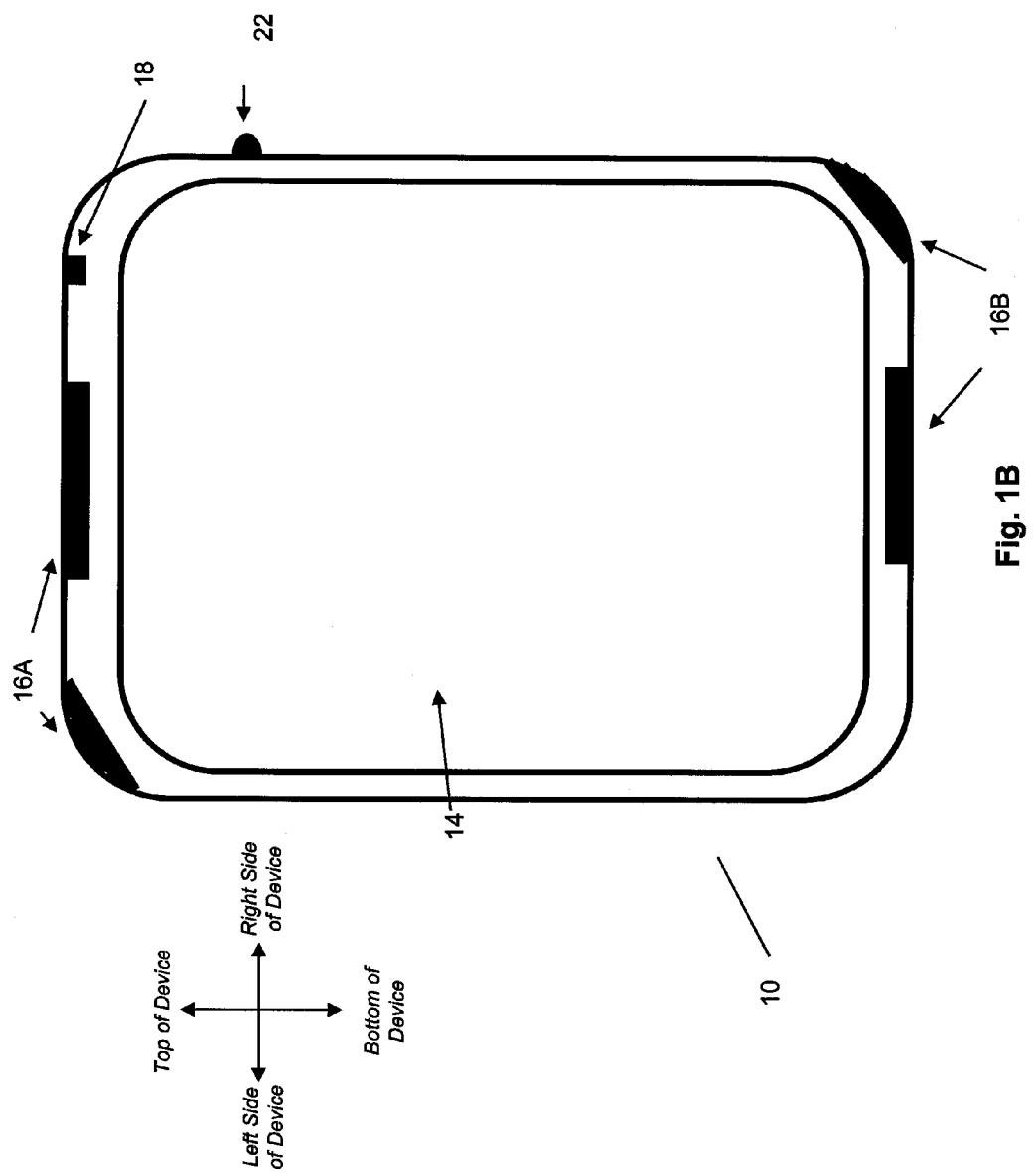

SYSTEM AND METHOD FOR ACTIVATING COMPONENTS ON AN ELECTRONIC DEVICE USING ORIENTATION DATA

FIELD OF DISCLOSURE

This disclosure relates to a system and method for activating components on an electronic device. In particular, the disclosure relates to analyzing orientation data relating to the device and activating components based on an orientation of the device determined from the orientation data.

BACKGROUND

Current wireless handheld mobile communication devices perform a variety of functions to enable mobile users to stay current with information and communications, such as e-mail, corporate data and organizer information while they are away from their desks. Such devices have displays and sophisticated operating systems providing Graphical User Interfaces (GUIs) that impart various static and moving images to the user.

Form factors of some handheld devices make it difficult to determine a "top" or "bottom" of the device. For example, when a handheld device is quickly removed from a user's pocket and placed on a table, it may be difficult to identify a "top" from a "bottom" of the device. Also when a user retrieves the device from his person (e.g. from a pocket), it may be oriented upside down. If the user tries to initiate a call with the device upside down, the speaker and microphones are not located in the proper locations for the orientation. Some form factors may have multiple displays, making it difficult to determine a "front" and "back" of the device.

BRIEF DESCRIPTION OF THE DRAWINGS

The disclosure provides, by way of example only, with reference to the accompanying drawings, in which:

FIG. 1B is a schematic representation of a front view of the electronic device of FIG. 1A with its display turned off;

DETAILED DESCRIPTION OF AN EMBODIMENT

Figure 1A:
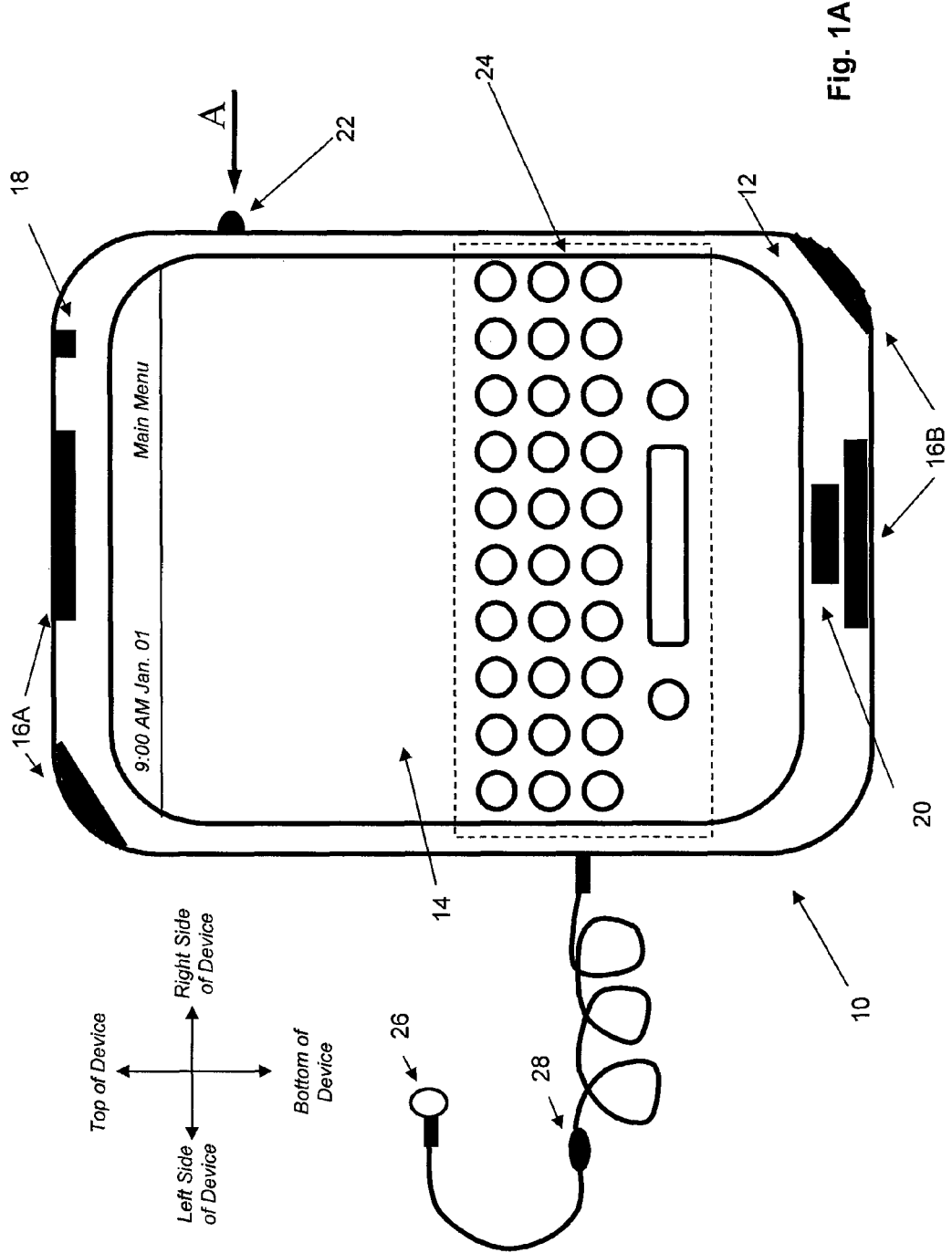
FIG. 1A is a schematic representation of a front view of an activated electronic device having an orientation analysis system according to an embodiment.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect, a method for activating components of a handheld electronic device is provided. The method comprises: monitoring data from a first sensor for the device; determining an orientation of the device by analyzing at least the data from the first sensor; and activating a first component on the device in view of the orientation of the device.

The method may further comprise deactivating a second component on the device in view of the orientation of the device.

The method may further comprise generating an output on a display of the device oriented to match the orientation of the device.

In the method, the first component may be a speaker located on an upper portion of the device; and the second component may be a microphone located on the upper portion of the device. Further, when the orientation indicates that the device is upright, the method may: activate the speaker; deactivate the microphone; and generate the output on the display in an upright orientation.

The method may further comprise analyzing data from a second sensor with the data from the first sensor to determine the orientation of the device.

In the method, the data from the second sensor may be compared against the data from the first sensor to determine the orientation of the device.

In the method, when the orientation indicates that the device is upside down, the speaker may be deactivated; the microphone may be activated; and the output on the display may be generated in an upside down orientation.

In the method, when the orientation indicates that the device is facedown, the speaker may be activated; the microphone may be deactivated; and the output on the display may be deactivated.

In the method, the first sensor may be an accelerometer.

The method may further comprise: monitoring data from a second sensor for the device; determining an orientation of the device by analyzing the data from the first sensor and the data from the second sensor; and activating a first component on the device in view of the orientation of the device.

In the method, the first sensor may be a light detector; and the second sensor may be a microphone.

In the method, when the orientation indicates that the device is upright, a microphone located on a lower portion of the device may also be activated.

In a second aspect, an activation circuit for activating components of a handheld electronic device is provided. The circuit comprises: an orientation module to determine an orientation of the device by analyzing at least data from a first sensor; and an activation module. The activation module activates a first component on the device in view of the orientation of the device; deactivates a second component on the device in view of the orientation of the device; and generates an output on a display of the device oriented with the orientation of the device.

In the circuit the first component may be a speaker located on an upper portion of the device; and the second component may be a microphone located on the upper portion of the device.

In the circuit, the orientation module may analyze the data from the first sensor with data from a second sensor to determine the orientation of the device.

In the circuit, when the orientation indicates that the device is upside down, the activation module may: deactivate the speaker; activate the microphone; and generate output on the display in an upside down orientation.

In the circuit, when the orientation indicates that the device is face down, the activation module may: activate the speaker; deactivate the microphone; and deactivate the output on the display.

In the circuit, the first sensor may be an accelerometer.

In the circuit, the first sensor may be a light detector; and the second sensor may be a microphone.

In the circuit, the data from the second sensor may be compared against the data from the first sensor to determine the orientation of the device.

In other aspects, various combinations of sets and subsets of the above aspects are provided.

Generally, an embodiment provides a system and method of determining an orientation of a (handheld) device, namely whether the device is rightside up, upside down, facedown or face up. An embodiment utilizes this determination and configures input and output (I/O) devices to align with the determined orientation. Multiple I/O devices may be provided at different locations on the device. Configurable I/O devices may be configured to provide different functions, depending on the determined orientation.

Exemplary details of aspect of embodiments are provided herein. First, a description is provided on general concepts and features of an embodiment as provided in a device. Then, further detail is provided on the system, data and algorithms used to determine an orientation of a device and then to use that determination to compare the movements against stored representations of gestures.

Figure 1C:
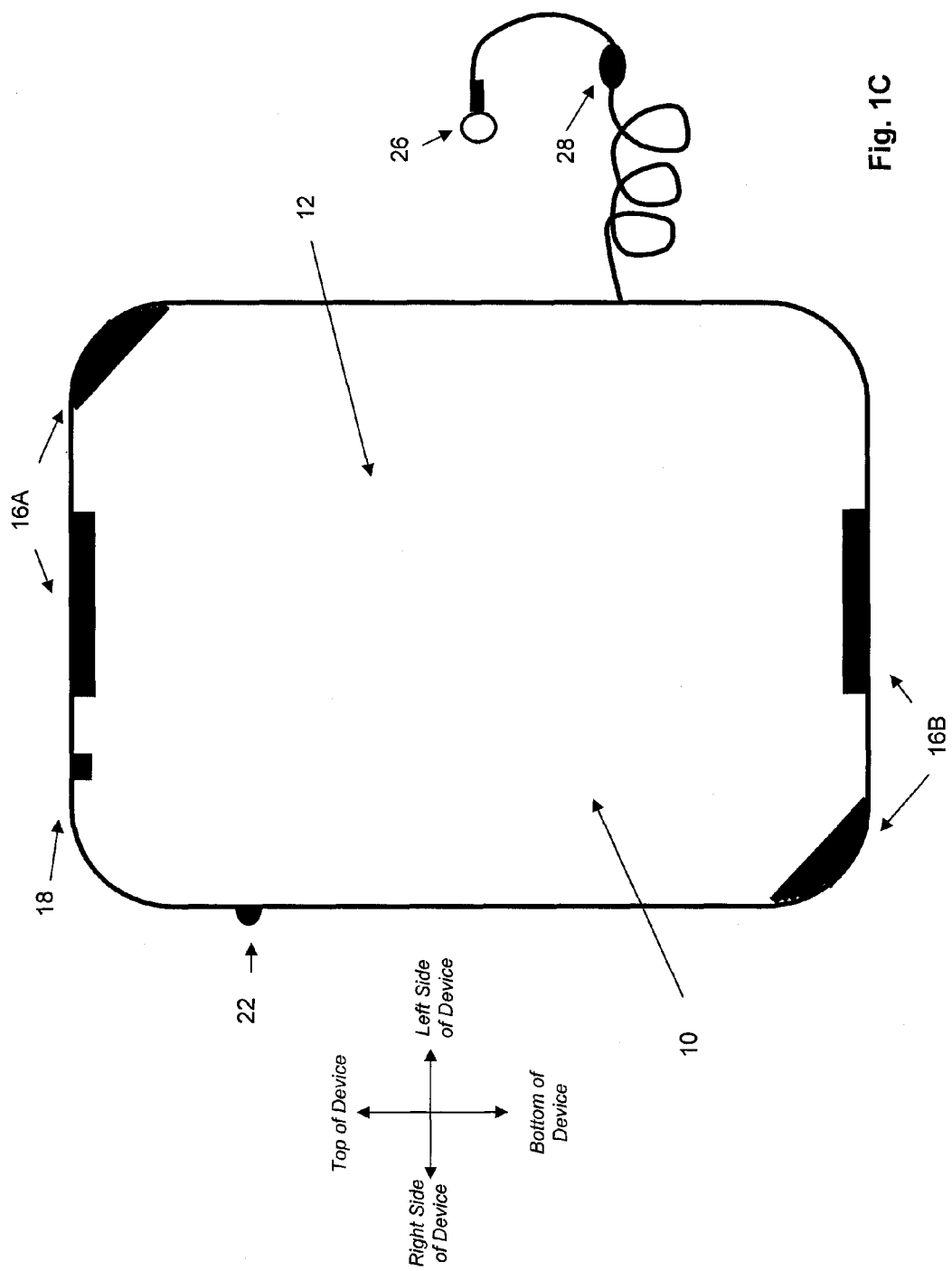
FIG. 1C is a schematic representation of a rear view of the electronic device of FIG. 1A.

As such, referring to FIGS. 1A-1C, some general features of a device are first provided. In FIG. 1A, a front view is shown of an activated electronic device in accordance with an embodiment of the disclosure, which is indicated generally at 10. In the present embodiment, electronic device 10 is based on a computing platform having functionality of an enhanced personal digital assistant with cell phone and e-mail features. It is, however, to be understood that electronic device 10 can be based on construction design and functionality of other electronic devices, such as smart telephones, desktop computers pagers or laptops having telephony equipment. In a present embodiment, electronic device 10 includes a housing 12, a liquid crystal display (LCD) 14, speakers 16, a light emitting diode (LED) indicator 18, a trackpad 20, an ESC ("escape") key 22, a telephone headset comprised of an ear bud 26 and a microphone 28. It is noted that speakers 16 are located in a top left corner (16A) and a bottom right corner (16B) of device 10. The speakers may be selectively activated. A microphone (not shown) may be provided near each of speaker 16.

As part of LCD 14, a virtual keypad 24 is provided, which is generated on LCD 14. Software operating on device 10 generates the images of the keys for keypad 24. LCD 14 may incorporate a touch screen display to provide sensors for keypad 24. Additional dedicated "hard" keys (not shown) may be provided on device 10. Trackpad 20 and ESC key 22 can be inwardly depressed along the path of arrow "A" as a means to provide additional input to device 10. One or more input devices, such as a trackball or trackwheel (not shown), may be provided.

It will be understood that housing 12 can be made from any suitable material as will occur to those of skill in the art and may be suitably formed to house and hold all components of device 10. Exemplary materials for housing 12 include one or more of any type of plastics, polycarbonate, metal, etc. Forming housing 12 may result in a housing 12 that is rigid, lightweight, durable, provides protection from external environmental elements and shock protection, provides large viewing areas for displays, etc. Housing 12 may be sized to comfortably fit in a user's hand.

Referring to FIGS. 1B and 1C, device 10 has been provided with a sleek industrial design that attempts to minimize use of protruding features, such as keys and openings. As such, when display 14 is turned off, keypad 24 is not generated. As such, in FIG. 1B, the front view of device 10 shows a form factor that has few substantial distinguishing features to readily identify an orientation of device 10 (e.g. rightside up or upside down). Even with the presence of some features, such as openings for speaker 16 and LED 18, a user may not be able to quickly identify visual cues that would indicate an orientation of device 10. Further, referring to FIG. 1C, a rear view of device 10 is shown. The rear panel of housing 18 follows the same clean design features of the front features of device 10. As such, again, there a few, if any, readily identifiable physical features that identify the top side or bottom side of device 10. It will be appreciated that when display 14 is turned off (or is dimly lit), a user may not readily be able to tell when device 10 is upright or upside down.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.11), Wireless PAN (IEEE 802.15 and Bluetooth), etc. and any others that support voice. Additionally, a Bluetooth network may be supported. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

As device 10 operates as a telephone, there is a general form factor where the user is expected to place one end of device 10, where a speaker is located, near his ear and the other end of device 10, where a microphone is located, near his mouth. However, as seen in FIGS. 1A-1C, it is possible that a user may pick up device 10 in an upside down orientation and try to initiate a telephone call. When device 10 is oriented upside down, speaker 16 may be at an end of device 10 that is near the user's mouth and the microphone conversely may be at the end that is near the user's ear. In such an orientation, the quality of the received and transmitted audio signals is lessened. Even for more conventional looking handheld devices, it is still possible to pick it up and attempt to use it when it is in the wrong orientation. An embodiment addresses these issues. Further detail is now provided on components of an embodiment.

Components of an input/output activation system provided in device 10 according to an embodiment are shown. Device 10 has device activation features that allow it to selectively activate and deactivate one or more of its components based on orientation conditions detected and derived by device 10. For example, if device 10 determines that its orientation is "rightside up", then device 10 activates/configures its I/O devices to suit that orientation. For example, a speaker located in the top portion of device 10 may be activated, as opposed to a speaker in a lower portion of device 10. Alternatively or subsequently, if device 10 is oriented "upside down" then the speaker in the lower portion may be activated and the speaker in the upper portion may be deactivated. For the purpose of the disclosure, it will be appreciated that an embodiment provides features and functions for activating or re-activating one or more components in device 10 depending on a given orientation of device 10.

Figure 1D:
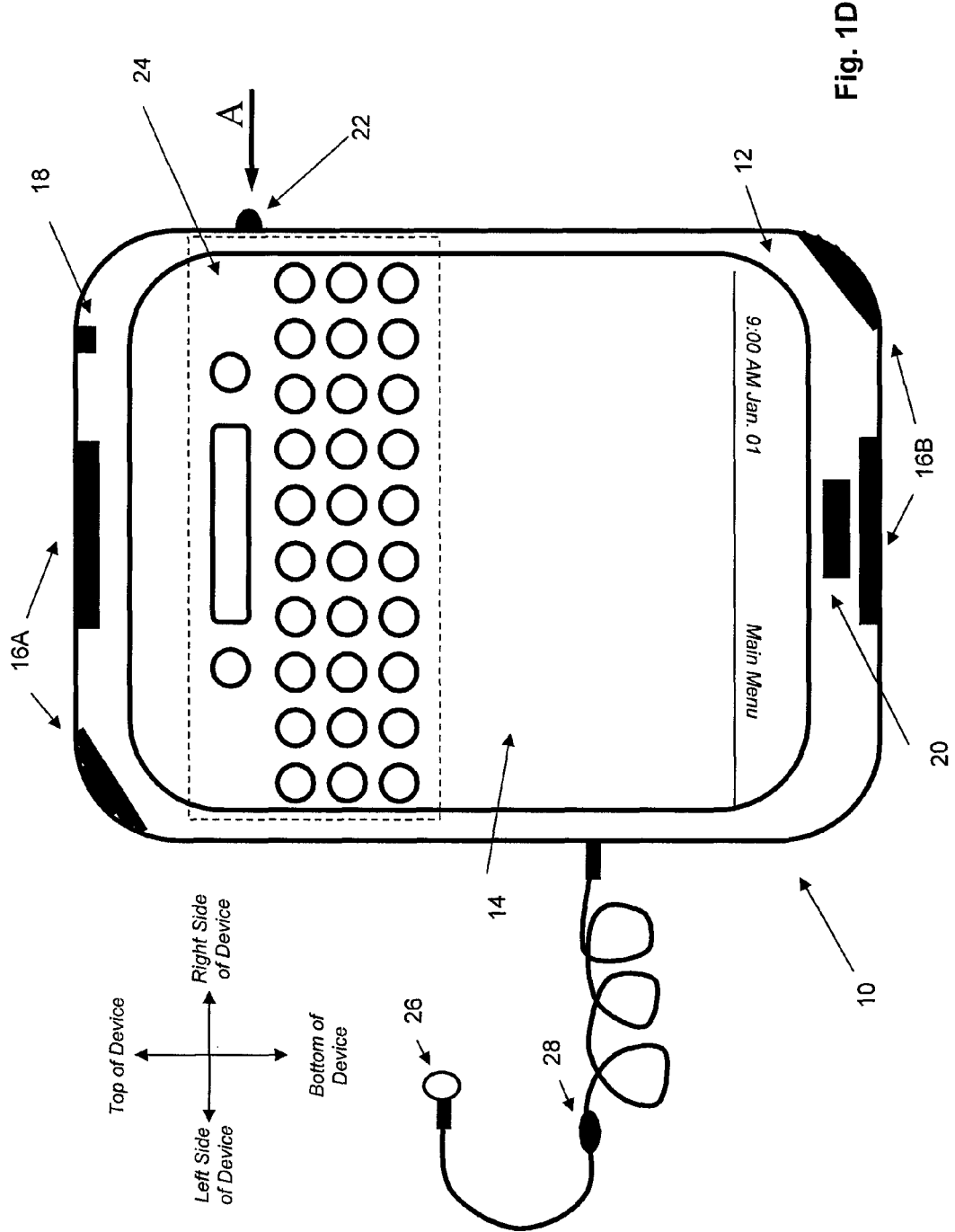
FIG. 1D is a schematic representation of the front view of the activated electronic device of FIG. 1A showing an alternative orientation of the device.
Figure 1E:
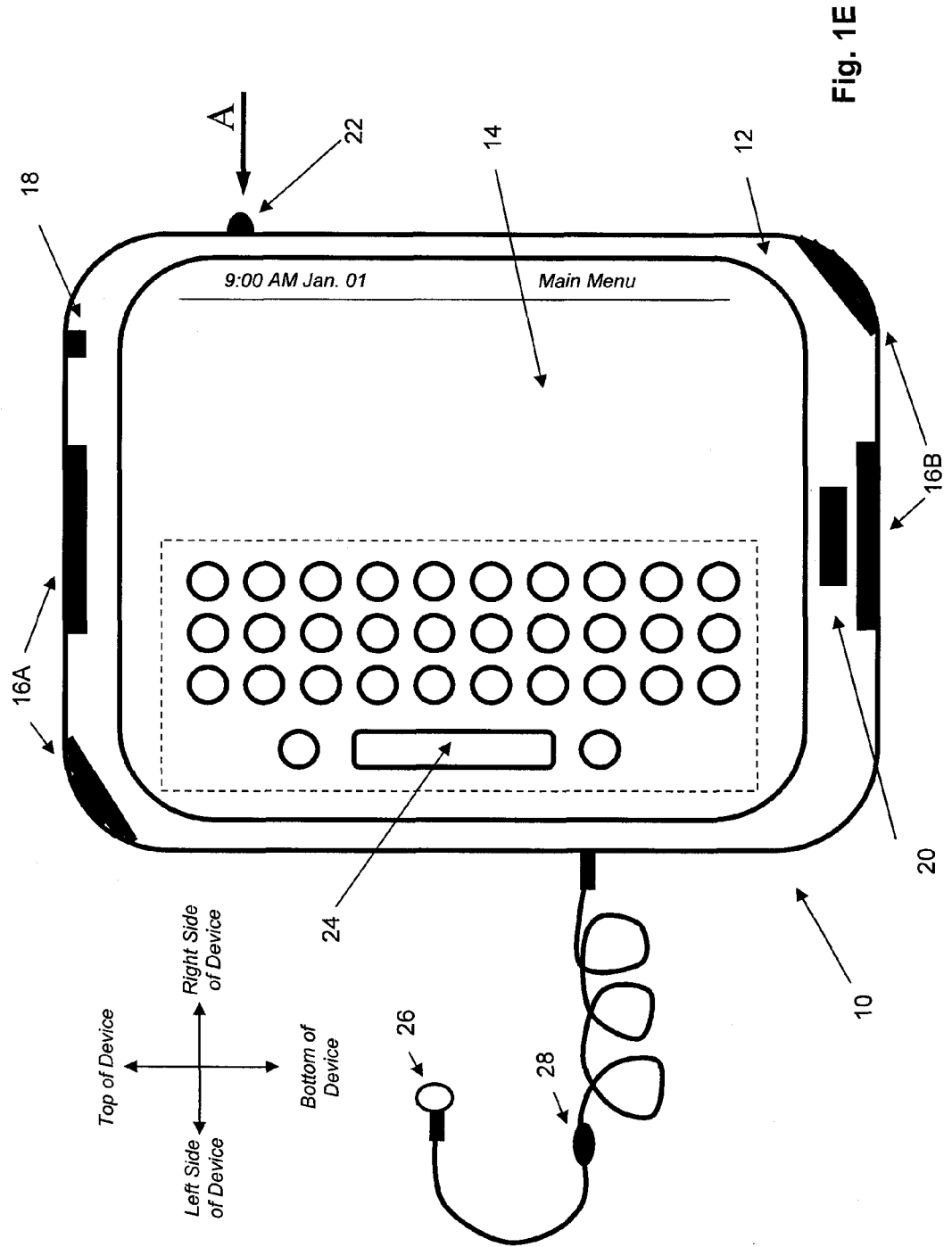
FIG. 1E is a schematic representation of the front view of the activated electronic device of FIG. 1A showing another orientation of the device.

Referring to FIG. 1A, when device 10 is picked up in an expected orientation, speaker 16A is at the "top" of device 10. As such, an embodiment may activate speaker 16A, while speaker 16B is not activated. Referring to FIG. 1D, when device 10 is picked up upside down, speaker 16B is at the "top" of device 10. As such, speaker 16B may be activated, while speaker 16A is not activated and a neighbouring microphone to speaker 16A may be activated. Also the text and graphics on display 14 is adjusted to be "upside down". Each or either of speakers 16A and 16B may be placed along about the transverse axis of device 10 at or near an end of device 10 or may be placed in a corner of device 10. Referring to FIG. 1E, in yet another orientation, when device 10 is picked up on its side, speaker 16B is at the "top" of device 10. As such, speaker 16B may be activated, while speaker 16A is not activated. A neighbouring microphone to speaker 16A may be activated. Also the text and graphics on display 14 is adjusted to be in landscape format.

Figure 2:
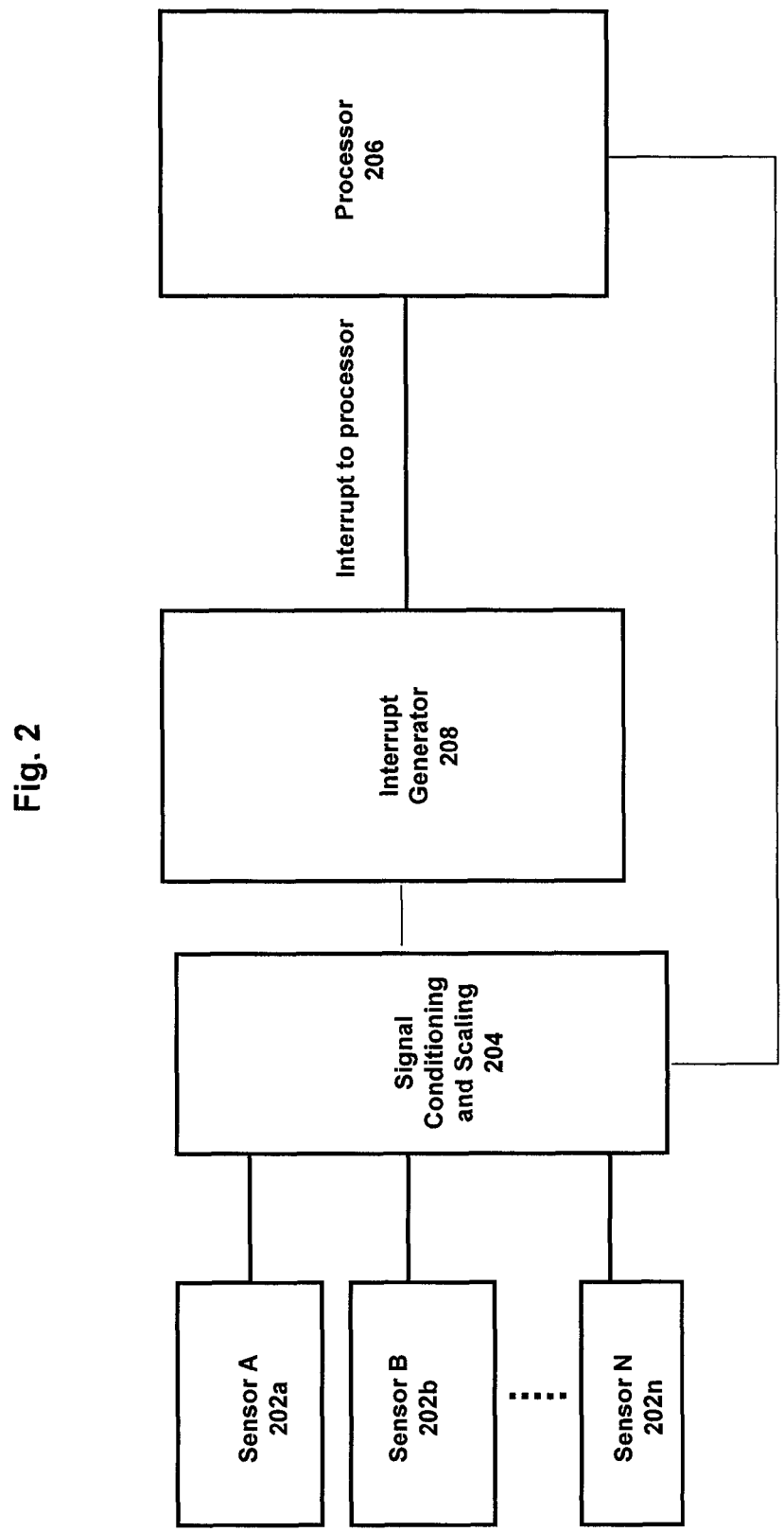
FIG. 2 is a block diagram of components of the orientation analysis system of the device of an embodiment of FIG. 1A.

Referring to FIG. 2, to that end, orientation system 200 identifies a current physical orientation of device 10. This determination can then be used to controls how and when certain components in device 10 are activated. System 200 includes sensors 202, signal conditioning and scaling module 204 and microprocessor 206. Data from sensors 202 is provided to signal conditioning and scaling module 204. An output from module 204 is signal(s) that provide orientation data which may be provided to microprocessor 206 through interrupt generator 208. The sensors may detect one or more orientation and/or movement conditions being imparted on device 10. Generally, upon detection of a condition (e.g. movement of the device) or a level of a condition (e.g. data from an accelerometer), sensors 202 generate electrical signals that may be proportional to the strength of the condition detected. Module 204 filters and scales its received signals, allowing signals from different sensors 202 to be compared on an equivalent numeric basis. For example, sensor 202a (not shown) may be a movement sensor (such as an accelerometer) that generates signals between −1 to +1 volt; sensor 202b (not shown) may be a mercury switch and may generate signals between 0 and 3 volts relative to the position of the mercury ball; and sensor 202c (not shown) may be a light sensor that may generate signals between 0 and 5 volts (or other ranges). These different ranges can be normalized by module 204 so that, if necessary, signals from different sensors can be compared. Signals from one or more sensor 202 (or other components) may be set up to be necessary trigger conditions before signals from other sensors are evaluated. Module 204 may also filter extraneous signals (e.g. signals that are too small, too large, too infrequent, etc.). Microprocessor 206 is the main control component of device 10. It has firmware applications that it accesses that provide most of the functions for device 10. Once orientation data is provided by system 200, microprocessor 206 may initiate another application or module to identify and activate a component in device 10.

Signals from sensors 202 may be provided directly to microprocessor 206 or through module 204 or through interrupt generator 208. Signals from interrupt generator 208 are provided to the interrupt line of microprocessor 206. This allows signals from generator 208 (and ultimately from sensors 202) to provide "real time" input values that an interrupt process operating on microprocessor 206 can use to determine what the signals from sensors 202 mean and what actions, if any, to take in view the signals.

Figure 3:
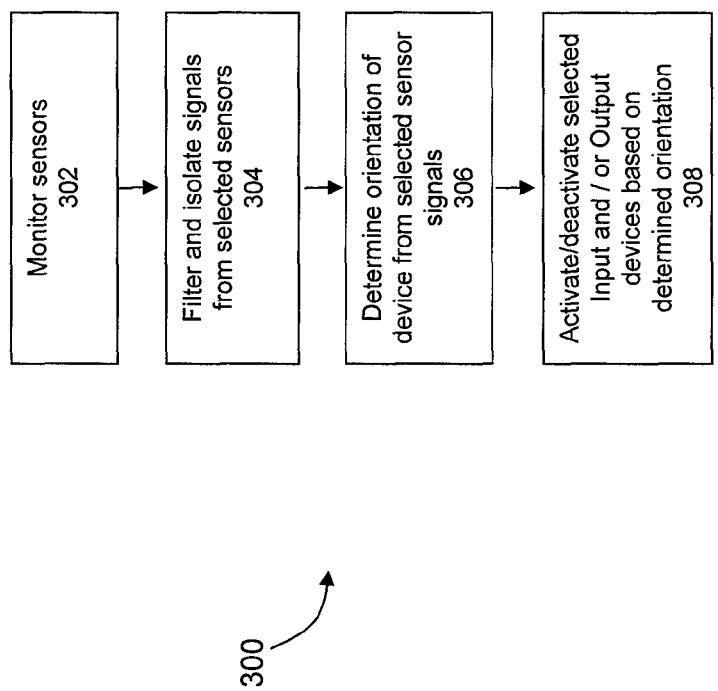
FIG. 3 is flow chart of functions performed by the orientation analysis system of the device of FIG. 1A.

Referring to FIG. 3, flow chart 300 provides an exemplary progression of activities that an activation system according to an embodiment device 10 transits in, to and through as it receives orientation data and processes it to determine what components, if any, to activate. In an embodiment, actions are executed by orientation system 200 and an orientation analysis module (described later) and/or other processes and modules operating on device 10.

At process 302, the activation system has been initiated and sensors in device 10 are monitored. The system may have been activated upon any event. For example, device 10 may be in a sleep mode and the activation system is used to monitor for an activation condition. Alternatively, device 10 may be active with an application executing and its display powered. In such a condition, device 10 will use activation system 200 to monitor the orientation of device 10 and determine if an adjustment of the orientation and or other components of device 10 are required.

The sensors may be any type of sensor that detects a physical condition, which may be used to indicate an orientation of device 10. For example, a sensor may be a gyroscope, accelerometer, motion sensor, mercury switch, pressure switch, light sensor, microphone, altimeter etc. Sensors 202 (FIG. 2) provide some exemplary sensors that may be used. At process 304, data from the sensors is filtered, isolated and processed. Module 204 (FIG. 2) provides some exemplary signal processing that may be provided. At process 306, an orientation of device 10 may be determined from selected sensor signals. This may be done in part by module 204 (FIG. 2) or it may be done in an application operating on microprocessor 206, such as an orientation analysis application (described below). In certain orientations there may not be a distinct orientation determined for the device. For example, when device is lying flat on a table, it may be "face up" with its display facing upwards or it may be "face down" with its display facing the table. This part of the orientation may be determined by sensor 202 (e.g. when sensor 202 is an accelerometer). However, additional orientation information may not be determinable (e.g. what direction the top of device 10 is facing). In such instances, an orientation may be selected from the orientation data provided. In such a case, a determination may be made to not change the orientation. An application operating on device 10 (e.g. telephone application, interne browsing application) may have operating/orientation preferences for its outputs as well. For example, it may be preferable for the telephone application to generate its display only in a portrait mode. Also, once a telephone call is initiated, the orientation may (or may not) be locked.

At process 308, once an orientation of device 10 is determined, then selected elements in device 10 may be activated and/or deactivated based on the determined orientation of device 10. This may be done in part by module 204 (FIG. 2) or it may be done in an application operating on microprocessor 206, such as an activation application (described below).

The operation of one or more processes in flow chart 300 may be conducted by one or more hardware or software components. The processes may be conducted within a single device 10 or through multiple devices. The execution of the processes of flow chart 300 may be done on a continuous basis, at predefined intervals (which may or may not be periodic), or upon certain activation events (such as the detection of a significant signal from a sensor).

Figure 4:
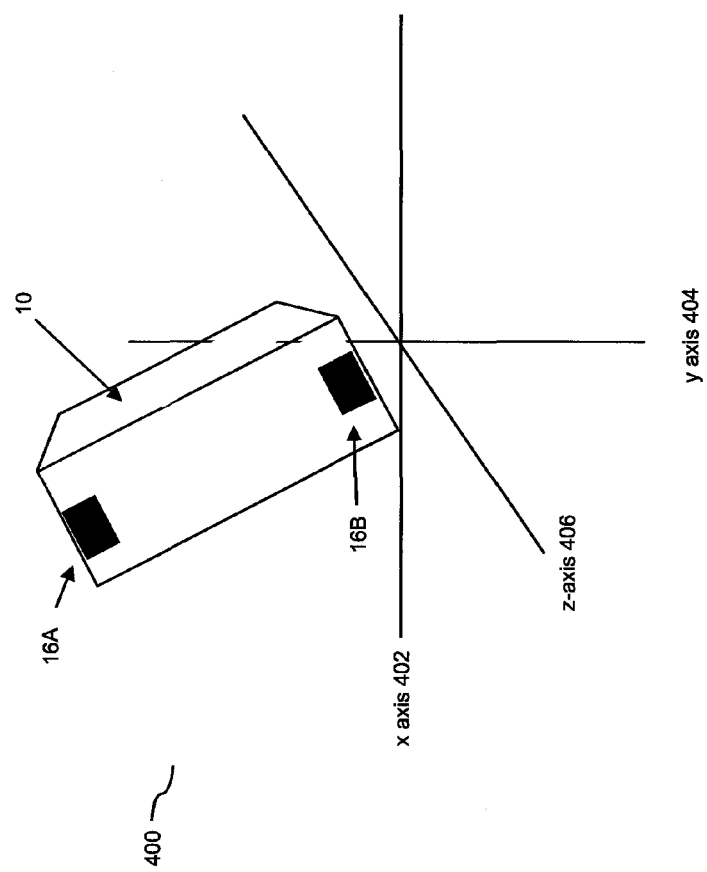
FIG. 4 is a schematic block diagram of an orientation scheme utilizing x, y and z axis used by the orientation analysis system of FIG. 1A.

As part of an orientation analysis, an embodiment may use a coordinate system to map a notional location and orientation of device 10 within that coordinate system. For one embodiment, FIG. 4 shows Cartesian coordinate system 400, having x-axis 402, y-axis 404 and z-axis 406. An orientation of device 10 may be determined from data provided by orientation system 200. Device 10 may be oriented in a generally vertical or horizontal position along any axis. Device 10 may be oriented right-side up or upside down along any axis. As shown, device 10 may be oriented face up or face down along any axis. Of course, device 10 may have orientation coordinates that cover all three axes. Sensor 202*a* as an accelerometer, provides signals representing the force of gravity and its direction when it is in a quiescent state. This may be used to determine an orientation of device 10. As such, an embodiment may make a determination of a "general" orientation of device 10. For example, device 10 may be "mostly upright" if it determined that its back is pitched at an angle that is no more than about +/−30 degrees from the y-axis. For example, device 10 may be "mostly horizontal" if it determined that its back is pitched at an angle that is no more than about +/−30 degrees from the x-axis. Determinations as to whether device 10 is rightside up, upside down, face up or face down along any axis may also be determined, which may ultimately be based on x, y and z coordinate sensor data readings. Also the orientation may be tracked in a different coordinate system, such as a spherical coordinate system. For the purpose of this disclosure the following phrase conventions are used to describe various orientations of device 10:

a) "upright" or "upside right" means that device 10 has its "intended" top side directed upwardly, per FIG. 1A, unless otherwise noted;

b) "upside down" means that device 10 has its "intended" top side directed downwardly, per FIG. 1D, unless otherwise noted;

c) "face up" means that the front of device 10 (generally having display 14 thereon) is horizontal and upwardly facing, e.g. with device 10 as per FIG. 1A lying on a table, unless otherwise noted;

d) "face down" means that the front of device 10 (generally having display 14 thereon) is downwardly facing, e.g. with device 10 lying on a table with display 14 facing the table;

e) "portrait" means that the longitudinal axis of device 10 is generally upright. There may be an "upright" and an "upside down" portrait orientation; and f) "landscape" means that the traverse axis of device 10 is generally upright. There may be an "upright" and an "upside down" landscape orientation.

These orientations are based on a device-centric frame of reference, where the ground is used as a common reference point. Other orientation schemes may be used.

The orientations can be considered in groups. An "upside right" or "upside down" group of orientations relates to an orientation of a device when it is (generally) perpendicular to the ground (e.g. it may be held in a user's hand during a telephone call). These orientations may be used to determine how to orient a display of device 10 screen and which speaker and microphone to enable when device 10 is activated, such as when using device 10 after you remove it out of your pocket and pick it up. The form factor and industrial design of device 10 may provide few visual cues as to what orients device 10 as being either upside right and/or upside down. An embodiment provides a reconfiguration of activation of components on device 10 based on the current orientation of device 10, saving the user from an effort to reorient it to an upside right orientation.

A "face up" or "face down" group of orientations relates to an orientation of a device when it is (generally) parallel to the ground (e.g. it may be lying on a table). A user may have an easier time in determining whether device 10 is "face up" or "face down" as visual cues in device 10 may assist in quickly identifying whether device 10 is face up or face down. For example, in one form factor the front of device 10 may be clearly be the front (with its display) and the back will clearly be the back. Using this orientation information, an embodiment may use the present "face up" or "face down" orientation to determine a user's intent for device 10. For example, placing device 10 "face down" on a table may cause some components to be activated and others to be deactivated. For example one set of speaker and microphone may be more optimized for speakerphone in the face down position may be used as an indication that one or more components on device 10 is to be turned off. As such, front speaker 16 may be deactivated as it will be sounds that will be directed towards the table. As well the main display may be turned off since its output cannot be viewed. A different LED notifier may be activated if the primary LED is not visible in a given orientation. Other sensors, such as a light sensor may be used to determine an orientation of device 10. For example, an embodiment may provide a first light sensor on the front of device 10 and a second light sensor on its back.

It will be appreciated that for a given new orientation, a re-orientation of components on device 10 may or may not be made. For example, if an orientation changes from "face up" to "face down" (or vice versa), the change may not necessarily cause a reorientation of the display or in the speaker and microphone components.

An orientation may be dominated by any one of a)-f) (e.g. a device is mostly upright). It will be appreciated that an orientation may include combinations orientations.

Figure 5:
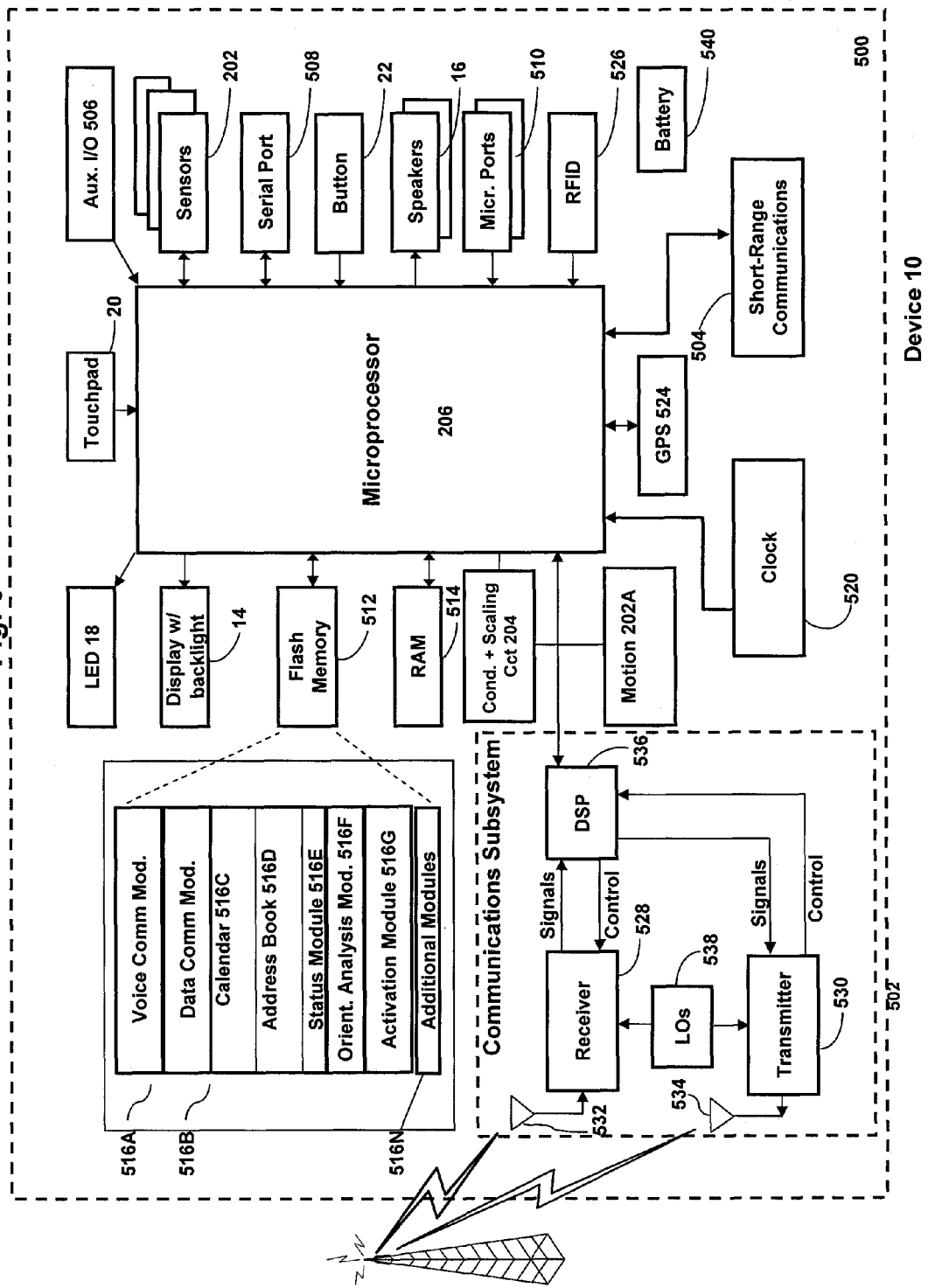
FIG. 5 is a block diagram of components and the orientation analysis system in device of FIG. 1A.

Referring to FIG. 5, further detail is provided on components of device 10 in schematic 500. The functional components are generally electronic, structural or electro-mechanical devices. In particular, microprocessor 206 is provided to control and receive almost all data, transmissions, inputs and outputs related to device 10. Microprocessor 206 is shown schematically as coupled to display 14 and other internal devices. Microprocessor 206 preferably controls the overall operation of the device 10 and its components. Exemplary microprocessors for microprocessor 206 include microprocessors in the Data 950 (trademark) series, the 6200 series and the PXA900 series, all available at one time from Intel Corporation. Microprocessor 206 is connected to other elements in device 10 through a series of electrical connections to its various input and output pins. Microprocessor 206 has an IRQ input line which allows it to receive signals from various devices. Appropriate interrupt firmware is provided which receives and reacts to the signals detected on the IRQ line.

In addition to the microprocessor 206, other internal devices of the device 10 are shown schematically in FIG. 5. These include: speakers 16 (which may be paired with a neighbouring microphone); buttons 22; sensors 202 (including motion sensor 202A), communication sub-system 502; short-range communication sub-system 504; auxiliary I/O devices 506; serial port 508; microphone port 510 for microphone 28; flash memory 512 (which provides persistent storage of data including local data relating to the status flags used by an embodiment); random access memory (RAM) 514; clock 520 and other device sub-systems (not shown). Device 10 is preferably a two-way radio frequency (RF) communication device having voice and data communication capabilities. In addition, device 10 preferably has the capability to communicate with other computer systems via the Internet. Device 10 may have a SIM card (not shown).

Sensors 202 and 202A may detect any physical condition around and about device 10, such as position, acceleration orientation, inclination, movement, sounds, heat (temperature), light, movement, humidity, stress, pressure, magnetic fields, voltage, current, x-rays, gamma rays, etc. A low-g MEMS (micro-electromechanical system) accelerometer may be used for motion sensor 202. Further, the accelerometer may be of almost any type, including a capacitive, piezoelectric, piezoresistive, or a gas-based accelerometer. An exemplary low-g MEM accelerometer is a LIS302DL tri-axis digital accelerometer, available from STMicroelectronics of Geneva, Switzerland. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals. Also, sensor 202 may be a gyroscope. Further, the gyroscope may be of almost any type, including an inertial, capacitive, piezoelectric, piezoresistive, or a gas-based gyroscope. An exemplary gyroscope is model ADIS16350 High Precision Tri-Axis Inertial Sensor from Analog Devices, Inc. Gyroscopes sense and convert a rotational motion into an electrical signal (producing a corresponding change in output) and are available in one, two or three axis configurations. Gyroscopes may produce digital or analog output signals. One or more sensors 202 may be located at strategic locations in device 10, such as locations where a user is expected to handle, touch or hold device 10 or locations where ambient conditions may be detected. Multiple sensors of the same type may be located on the top, bottom, front and rear of device 10.

To improve sensitivities of a gyroscope, its outputs can be calibrated to compensate for individual axis offset, center of gravity issues for device 10 in regards to its location in housing 118 and sensitivity variations. Calibrations can also be performed at the system level, providing end-to-end calibration. Calibrations can also be performed by collecting a large set of measurements with the device in different orientations.

Microphone port 510, auxiliary I/O devices 506, touchpad 20 and other components of device 10 may also provide input signals that may be used as sensors for an embodiment.

Operating system software executed by the microprocessor 206 is preferably stored in a computer-readable medium, such as flash memory 512, but may be stored in other types of memory devices, such as read-only memory (ROM) or similar storage element. In addition, system software, specific device applications, or parts thereof, may be temporarily loaded into a volatile store, such as RAM 514. Communication signals received by the mobile device may also be stored to RAM 514.

Microprocessor 206, in addition to its operating system functions, enables execution of software applications on device 10. A set of software (or firmware) applications, generally identified as applications 516, that control basic device operations, such as voice communication module 516A and data communication module 516B, may be installed on the device 10 during manufacture or downloaded thereafter. Calendar application 516C and address book application 516D provide useful tracking tools for the user of device 10. Status module 516E monitors and evaluates the status of various capabilities of device 10 (e.g. its communication connections, battery power, available memory, sensors) and updates data stored on device 10 with this information. Module 516E may also generate and send communications to external devices regarding this information on a periodic basis or as statuses change.

Orientation analysis module 516F receives data from various components of device 10, such as condition and scaling circuit 204, motion sensor 202A, sensors 202, GPS module 524, RFID module 526, communication module 502, short-range communication sub-system 504, time and day data, calendar data, etc. The data collectively can be used to determine an orientation of device 10 (as provided for example in FIGS. 2 and 4) based on any data provided from sensors 202 or other components. Override (hardware/software) data and switch settings may also be used to determine the orientation of device 10. Module 516F may provide status messages to external devices and servers, based on received requests or changes in activity. Module 516F may impose thresholds on the activity before sending such status messages. In one embodiment signals from sensors 202 are provided to microprocessor 206 for evaluation by module 516F. In another embodiment signals from sensors 202 are provided to module 204 which filters the signals and provides them to microprocessor 206 for evaluation by module 516F.

Activation module 516G receives and extracts any commands from orientation analysis module 516F and determines whether to activate/deactivate one or more components on device 10. It may also determine how text and graphics are to be displayed on display 14 (e.g. rightside up, upside down, in portrait or landscape mode etc.). Table A1 below provides an exemplary matrix of deemed orientations based on detected conditions from sensors 202 that module 516G may determine from data provided to it:

TABLE A1

| Deemed Orientation | Sensors Set A | Sensors Set B | Sensors Set C |
|---|---|---|---|
| Upright | Mercury switch reading: upright | Accelerometer sensor reading: upright | Tilt sensor reading: upright |
| Upside Down | Mercury switch reading: upside down Front microphone has higher signal reading than rear microphone | Accelerometer sensor reading: upside down | Tilt sensor reading: upside down |
| Horizontal | Mercury switch reading: horizontal | Accelerometer sensor reading: horizontal | Tilt sensor reading: horizontal |

Note that in Table A1, face up and face down orientation data is not used. Such data may be provided, but it may be disregarded or selectively used.

Table B1 below provides an exemplary matrix of actions based on deemed orientations that module 516G may initiate upon determining an orientation of device 10 from Table A1

TABLE B1

| Orientation | Speaker 16A | Speaker 16B | Display 14 |
|---|---|---|---|
| Upright | On; turn off neighbouring microphone | Off; turn on neighbouring microphone | upright display |
| Upside Down | Off; turn on neighbouring microphone | On; turn off neighbouring microphone | upside down display |
| Horizontal | On; turn off neighbouring microphone | Off; turn on neighbouring microphone | landscape, upright display |

The orientation data may also be used to qualify an output of a component. For example, an output level of a speaker may be increased if the orientation is, for example, face down. Also the sensitivity of a microphone may be increased if, for example, the orientation of the device is upside down. In some embodiments, when a speaker is turned on, its neighbouring microphone may not be deactivated (and vice versa). Other buttons 22 on device 10 may be reconfigured to provide different actions, depending on the orientation of device 10.

It will be appreciated that other orientation combinations may be considered. For example, in a user-centric orientation scheme, the orientation of the device may be derived based on its relative orientation to its user. Table A2 below provides another exemplary matrix of deemed orientations based on detected conditions from sensors 202 that module 516G, where various user-centric orientations are considered.

TABLE A2

| Deemed Orientation | Sensors Set A | Sensors Set B | Sensors Set C |
| --- | --- | --- | --- |
| Face up, with bottom of device directed to user | Mercury switch reading: face up | Accelerometer sensor reading: face up | Tilt sensor reading: face up |
| Face up, with top of device directed to user | Mercury switch reading: face up Front microphone has higher signal reading than rear microphone | Accelerometer sensor reading: face up | Tilt sensor reading: face up |
| Face down, with bottom of device directed to user | Mercury switch reading: face down Rear microphone has higher signal reading than front microphone | Accelerometer sensor reading: face down | Tilt sensor reading: face down |
| Face down, with top of device directed to user | Mercury switch reading: face down Top microphone has higher signal reading than bottom microphone | Accelerometer sensor reading: face down | Tilt sensor reading: face down |

For example, the orientation of "face up, with bottom of device directed to user" reflects a device lying on a table where its bottom end (with the microphone) is closer to the user than the top end (where the speaker is located). As such, the device is in an expected orientation to the user. Meanwhile, the orientation of "face up, with top of device directed to user" reflects that device lying on a table where its top end is closer to the user than the bottom end. As such, the device is in an "upside down" orientation to the user. It may require orientation reading from several sensors to determine the location of a user relative to a device. For example, signals from two microphones located at a spaced relationship may be used to determine a "closer" source of sound, presumed to be the user.

Table B2 below provides an exemplary matrix of actions based on deemed orientations that module 516G may initiate upon determining an orientation of device 10 from data from Table A2:

TABLE B2

| Orientation | Speaker 16A | Speaker 16B | Display 14 |
| --- | --- | --- | --- |
| Face up, with bottom of device directed to user | On; turn off neighbouring microphone | Off; turn on neighbouring microphone | upright display |
| Face up, with top of device directed to user | Off; turn on neighbouring microphone | On; turn off neighbouring microphone | upside down display |

TABLE B2-continued

| Orientation | Speaker 16A | Speaker 16B | Display 14 |
| --- | --- | --- | --- |
| Face down, with bottom of device directed to user | On; turn off neighbouring microphone | Off; turn on neighbouring microphone | upright display |
| Face down, with top of device directed to user | Off; turn on neighbouring microphone | On; turn off neighbouring microphone | upside down display |
| Face up | On; turn off neighbouring microphone | Off; turn on neighbouring microphone | landscape, upright display |

Activation module 516G may change the activation of components on device 10 as device 10 is moved to different orientations. Different thresholds may be used to initiate changes. For example, an initial orientation may be set where the threshold for the initial orientation is fairly small (e.g. +/−about 5-10 degrees—or more or less—from an axis). However, for a subsequent change in orientation, an embodiment may set a higher threshold for a movement before a change is initiated. For example, a second change may require that the orientation exceeds about 30-40 degrees (or more or less) from its current "main" orientation axis.

As well, additional software modules, such as software module 516N, which may be for instance a personal information manager (PIM) application, may be installed during manufacture or downloaded thereafter into device 10. Data associated with each application can be stored in flash memory 812.

Data communication module 516B may comprise processes that implement features, processes and applications for device 10 as provided and described earlier, allowing device 10 to generate track status of various components of device 10 and to generate and send messages to external devices.

Communication functions, including data and voice communications, are performed through the communication sub-system 502 and the short-range communication sub-system 504. Collectively, sub-systems 502 and 504 provide the signal-level interface for all communication technologies processed by device 10. Various applications 516 provide the operational controls to further process and log the communications. Communication sub-system 502 includes receiver 528, transmitter 530 and one or more antennas, illustrated as receive antenna 532 and transmit antenna 534. In addition, communication sub-system 502 also includes processing modules, such as digital signal processor (DSP) 536 and local oscillators (LOs) 538. The specific design and implementation of communication sub-system 502 is dependent upon the communication network in which device 10 is intended to operate. For example, communication sub-system 502 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 10. In any event, communication sub-system 502 provides device 10 with the capability of communicating with other devices using various communication technologies, including instant messaging (IM) systems, text messaging (TM) systems and short message service (SMS) systems.

In addition to processing communication signals, DSP 536 provides control of receiver 528 and transmitter 530. For example, gains applied to communication signals in receiver 528 and transmitter 530 may be adaptively controlled through automatic gain-control algorithms implemented in DSP 536.

Short-range communication sub-system 504 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly enabled systems.

Powering the entire electronics of the mobile handheld communication device is power source 540. In one embodiment, the power source 540 includes one or more batteries. In another embodiment, the power source 540 is a single battery pack, especially a rechargeable battery pack. A power switch (not shown) provides an "on/off" switch for device 10. A power source interface (not shown) may be provided in hardware, firmware, software or a combination of such elements to selectively control access of components in device 10 to power source 540. Upon activation of the power switch an application 516 is initiated to turn on device 10. Upon deactivation of the power switch, an application 516 is initiated to turn off device 10. Power to device 10 may also be controlled by other devices and by software applications 516.

Figure 6:
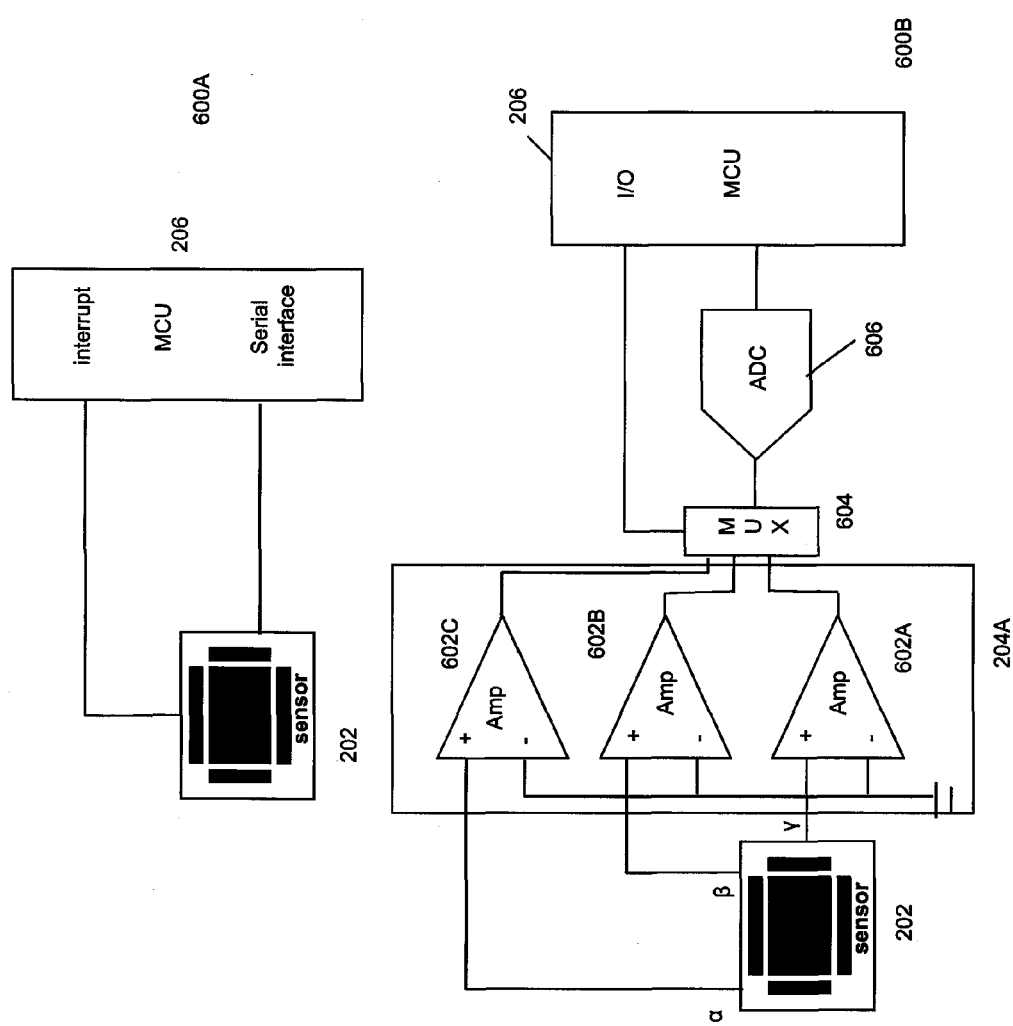
FIG. 6 is a block diagram of two movement detection systems of the embodiment of FIG. 1A.

Referring to FIG. 6, with some algorithms of an embodiment described, further detail is provided on how aspects of condition and scaling circuit 204 and its related components are provided. Therein, two sensors arrangements for device 10 are shown. Circuit 600A shows sensor 202 directly connected to the interrupt and serial interface input lines of microprocessor 206. Accordingly, software operating on microprocessor 206 is provided to selectively monitor signal(s) from sensor 202A to determine when movement of device 10 has been detected. The circuit between sensor 202 and microprocessor 206 can be considered to be one version of circuit 204. Software operating on microprocessor 206 determines when a notable signal has been generated by sensor 202. Circuit 600B shows sensor 202 connected to trigger circuit 204A having two differential comparators 602A and 602B, which then have their outputs attached to an analog mux 604. The mux selectively provides its output according to a control signal generated by microprocessor 206. The analog output of mux 604 is converted to a set of digital signals by analog to digital converter 606, which then provides the output to microprocessor 206. As with other implementation, software operating on microprocessor 206 determines when a notable signal has been generated by sensor 202. Reading of positions determined by the software can be stored in memory 512 or 514. The software can also create an average reading of the movement readings. This average reading can be used to determine when device 10 is in a resting position or when it is effectively in a resting position (e.g. it is being moved only in inconsequential amounts).

Figure 7:
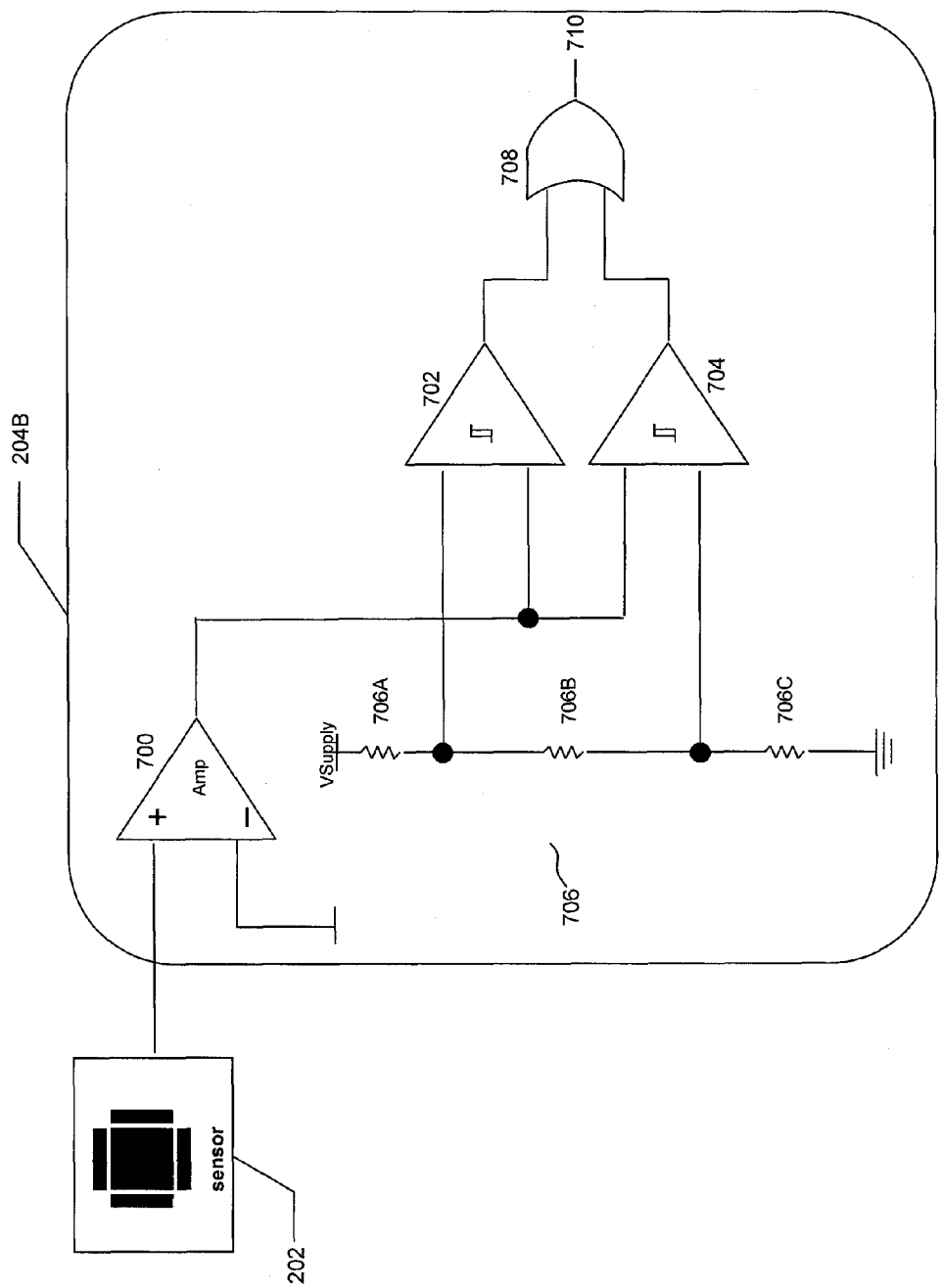
FIG. 7 is a block diagram of an alternative movement detection system the embodiment of FIG. 1A.

Referring to FIG. 7, an alternative circuit 204B is shown for sensor 202 which is aligned as a single axis analog sensor. Sensor 202A can be oriented such that its output detects movement along a desired axis (e.g. 'Z' axis detecting when device moved vertically). Additional axes may be monitored by replicating circuit 204B for each additional axis. Briefly, the output of sensor 202 is provided to buffer amp 700. The output of buffer amp 700 is provided in tandem to comparators 702 and 704. The other inputs of comparators 702 and 704 are taken from different taps on resistor ladder 706, comprising resistors 706A, 706B and 706C. Comparators 702 and 704, which may be comparators with or without hysteresis, each produce upper and lower limit comparison signals for the output of sensor 202. If the value of the signal from sensor 202 is either above the upper limit set by the parameters of comparator 702 (comparing the signal from sensor 202 against its tap from the resistor ladder 706) or below the lower limit set by the parameters of comparator 704 (comparing the signal from sensor 202A against its tap from the resistor ladder 706) then OR gate 708 generates a trigger signal 710. It will be appreciated that the limits can be used to define a range of signals detected by sensor 202 representing when be device 10 is either stationary (e.g. at rest) or being moved.

It will be appreciated that other circuits using different combinations of sensors and triggering components and threshold detectors may be used to provide functionalities of sensor 202A and circuit 204. In other embodiments, a single comparator can be used to perform comparisons. In other embodiments, other sensors 202 (e.g. heat, IR, pressure, etc.) may be connected to a comparable detection circuit to any circuit as provided in FIG. 6 or 7.

It will be appreciated that modules 516F and 516G and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications, shared among or separated into different applications. Modules may be contained within other modules. Different signalling techniques may be used to communicate information between applications using known programming techniques. Known data storage, access and update algorithms allow data to be shared between applications. It will further be appreciated that other applications and systems on device 10 may be executing concurrently with any application 516. As such, one or more aspects of modules 516F and 516G may be structured to operate in as a "background" application on device 10, using programming techniques known in the art. The system may be incorporated into any electronic device, such as a communication device, a portable electronic device, a personal computer, a keyboard, keypad or the like. The firmware and software may be implemented as a series of processes and/or modules that provide the functionalities described herein. Interrupt routines may be used. Data may be stored in volatile and non-volatile devices described herein and updated by the hardware, firmware and/or software. Some of the processes may be distributed.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

It will be appreciated from the disclosure that an embodiment can determine an orientation of a device, and can use this determination to configure I/O devices to align with the determined orientation. This provides an enhanced user's experience with the device, as the user is not required to be concerned as to whether he is holding the device "upside down" or not when initiating a function, such as a telephone call. Further as the user continues to handle the device, different I/O devices can be activated and/or deactivated, as the orientation changes.

The present disclosure is defined by the claims appended hereto, with the foregoing description being merely illustrative of a preferred embodiment. Those of ordinary skill may envisage certain modifications to the foregoing embodiments which, although not explicitly discussed herein, do not depart from the scope of the disclosure, as defined by the appended claims.

The invention claimed is:

1. A method for activating components of a handheld electronic device, comprising:
    monitoring data from a first sensor for the device;
    determining an orientation of the device by analyzing at least the data from the first sensor; and
    when the orientation indicates that the device is face down,
        activating a speaker on the device;
        deactivating a microphone on the device; and
        deactivating an output on a display of the device.

2. The method for activating components of a handheld electronic device of claim 1, wherein:
    the speaker is located on an upper portion of the device; and
    the microphone is located on said upper portion of the device.

3. The method for activating components of a handheld electronic device of claim 1, further comprising:
    analyzing data from a second sensor with the data from the first sensor to determine the orientation of the device.

4. The method for activating components of a handheld electronic device of claim 3, wherein:
    the data from the second sensor is compared against the data from the first sensor to determine the orientation of the device.

5. The method for activating components of a handheld electronic device of claim 1, wherein:
    when the orientation indicates that the device is upside down,
        the speaker is deactivated;
        the microphone is activated; and
        the output on the display is generated in an upside down orientation.

6. The method for activating components of a handheld electronic device of claim 1, further comprising:
    when the orientation indicates that the device is face up,
        activating the speaker;
        deactivating the microphone; and
        activating the output on the display.

7. The method for activating components of a handheld electronic device of claim 1, wherein:
    the first sensor is an accelerometer.

8. The method for activating components of a handheld electronic device of claim 1, wherein:
    the orientation of the device is determined by analyzing the data from the first sensor and data from a second sensor for the device.

9. The method for activating components of a handheld electronic device of claim 8, wherein:
    the first sensor is a light detector; and
    the second sensor is a microphone.

10. The method for activating components of a handheld electronic device of claim 1, further comprising:
    when the orientation indicates that the device is upright, activating a second microphone located on a lower portion of the device.

11. The method for activating components of a handheld electronic device of claim 1, further comprising:
    when the orientation indicates that said device is upright,
        the speaker is activated;
        the microphone is deactivated; and
        the output on the display is generated in an upright orientation.

12. An activation circuit for activating components of a handheld electronic device, comprising:
    an orientation module to determine an orientation of the device by analyzing at least data from a first sensor; and
    an activation module to
        activate a speaker on the device when the orientation indicates that the device is face down;
        deactivate a microphone on the device when the orientation indicates that the device is face down; and
        deactivate an output on a display of the device when the orientation indicates that the device is face down.

13. The activation circuit for activating components of a handheld electronic device as claimed in claim 12, wherein the orientation module:
    analyzes the data from the first sensor with data from a second sensor to determine the orientation of the device.

14. The activation circuit for activating components of a handheld electronic device as claimed in claim 13, wherein:
    the first sensor is a light detector; and
    the second sensor is a microphone.

15. The activation circuit for activating components of a handheld electronic device as claimed in claim 12, wherein when the orientation indicates that the device is upside down, the activation module:
    deactivates the speaker;
    activates the microphone; and
    generates the output on the display in an upside down orientation.

16. The activation circuit for activating components of a handheld electronic device as claimed in claim 12, wherein:
    the first sensor is an accelerometer.

* * * * *